United States Patent [19]

Ito

[11] Patent Number: 4,636,688

[45] Date of Patent: Jan. 13, 1987

[54] GYROTRON DEVICE

[75] Inventor: Yasuyuki Ito, Yokohama, Japan

[73] Assignee: Kabushiki Kaisha Toshiba, Kawasaki, Japan

[21] Appl. No.: 655,466

[22] Filed: Sep. 28, 1984

[30] Foreign Application Priority Data

| | | | |
|---|---|---|---|
| Sep. 30, 1983 | [JP] | Japan | 58-180199 |
| Mar. 19, 1984 | [JP] | Japan | 59-51110 |
| Mar. 19, 1984 | [JP] | Japan | 59-51111 |
| Mar. 19, 1984 | [JP] | Japan | 59-51112 |
| Mar. 19, 1984 | [JP] | Japan | 59-51113 |
| Jun. 13, 1984 | [JP] | Japan | 59-119876 |

[51] Int. Cl.[4] .............. H01S 25/00

[52] U.S. Cl. .............. 315/4; 315/5; 315/3; 315/5.41; 315/5.44; 372/2

[58] Field of Search .............. 315/5, 3, 4, 5.18, 5.24, 315/5.34, 5.35, 5.41, 5.44; 333/230; 372/2, 94, 99

[56] References Cited

U.S. PATENT DOCUMENTS

| | | | |
|---|---|---|---|
| 4,356,430 | 10/1982 | Stone et al. | 315/5 |
| 4,367,551 | 1/1983 | Gover | 372/2 |
| 4,398,121 | 8/1983 | Chodorow et al. | 315/5 |
| 4,491,765 | 1/1985 | Manheimer et al. | 315/5 |
| 4,531,103 | 7/1985 | Evans et al. | 315/5 |
| 4,554,484 | 11/1985 | Read et al. | 315/5 |
| 4,562,380 | 12/1985 | Dionne | 372/2 |

FOREIGN PATENT DOCUMENTS

| | | | |
|---|---|---|---|
| 0119902 | 9/1984 | European Pat. Off. | 315/5 |

*Primary Examiner*—David K. Moore
*Assistant Examiner*—M. Razavi
*Attorney, Agent, or Firm*—Oblon, Fisher, Spivak, McClelland & Maier

[57] ABSTRACT

A gyrotron device comprising a magnetron injection gun for emitting a sectionally-ring-shaped electron beam, a superconducting coil for applying magnetic field to the electron beam emitted from the gun, a ring-shaped resonator mirror for quasi-optically reflecting and resonating those electromagnetic waves which are oscillated when the electron beam passes along the magnetic lines of force generated by the superconducting coil and which propagate in the radial direction, while radially emitting a portion of the electromagnetic waves, and a plurality of transmission mirrors for quasi-optically reflecting and transmitting the electromagnetic waves which have been emitted in the radial direction of the resonator mirror.

14 Claims, 16 Drawing Figures

FIG. 3
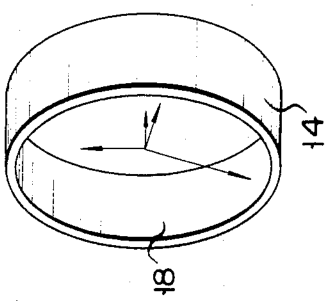
FIG. 1
PRIOR ART
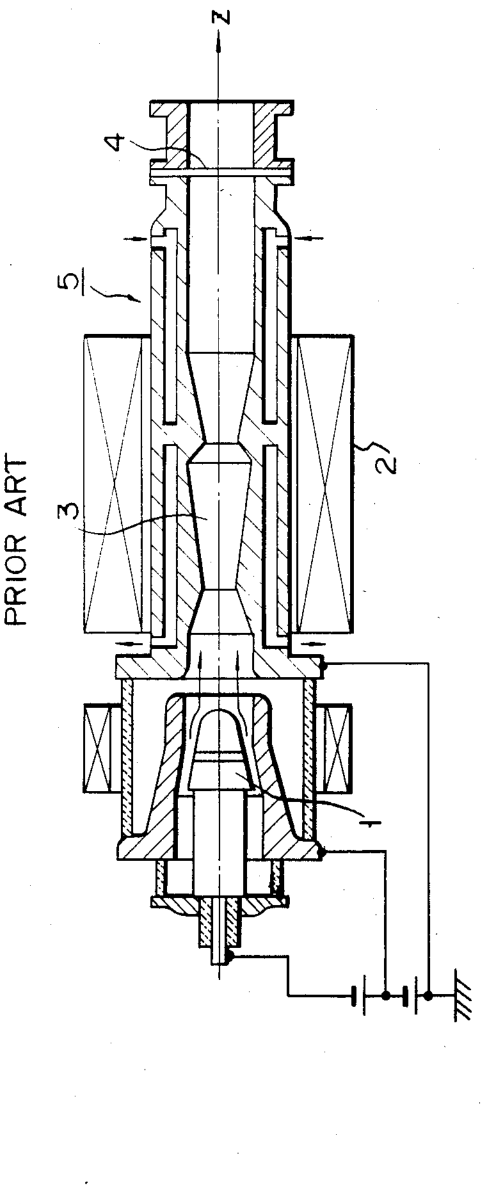
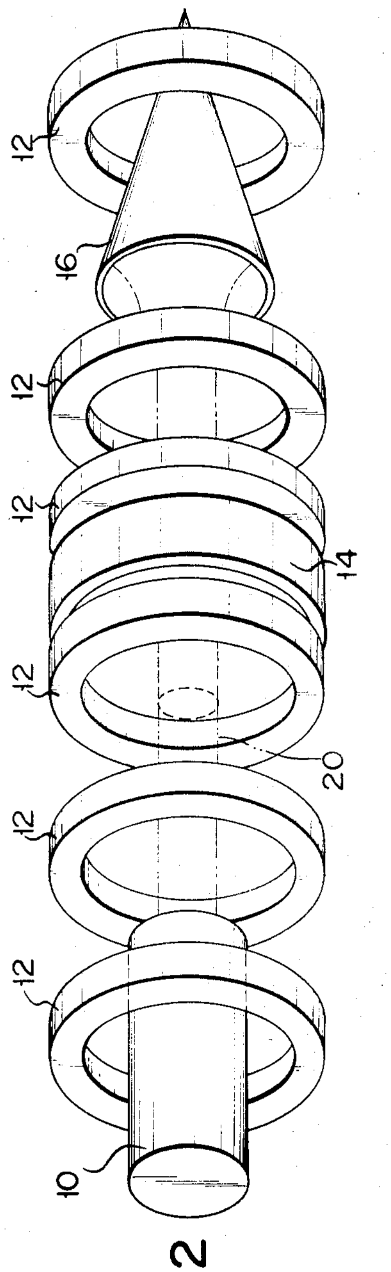
FIG. 2

GYROTRON DEVICE

BACKGROUND OF THE INVENTION

The present invention relates to a gyrotron device for generating a beam of an electromagnetic wave and, more particularly, it relates to a gyrotron device applied to the electron cyclotron resonance heating, i.e., heating plasma in a nuclear fusion reactor with the electromagnetic wave.

FIG. 1 shows a gyrotron device of this type, whose construction will be briefly described below.

The gyrotron device comprises an electron gun 1 for emitting an electron beam in the direction of arrow Z, a magnetic coil 2 for giving a cyclotron movement to electrons in the electron beam emitted from the electron gun 1, a cavity resonator 3 for resonating the electromagnetic wave generated from the electron beam, and an output section 5 for transmitting the electromagnetic wave through an output window 4.

When the beam of an electromagnetic wave with a frequency higher than 100 GHz and of 10 MW is supplied from the output section 5, using the gyrotron device with the above-mentioned cavity resonator 3, the resonating frequency of the electrons in the cavity resonator 3 is so high that the resonator 3 cannot have an inner diameter large enough to withstand Joule heat to a tolerable level. The inner wall area of the cavity resonator 3 must be made small accordingly. As a result, the ohmically heated inner wall surface of the cavity resonator 3 inevitably receives an extremely high heat load (>1 KW/cm$^2$). Therefore, it is practically impossible for this gyrotron device to supply a beam of continuous or long pulse electromagnetic waves having a frequency higher than 100 GHz and of 10 MW. A complex system having a plurality gyrotron devices must be used to achieve the electron cyclotron resonance heating of fusion plasma.

In the above-mentioned gyrotron device, the beam of electromagnetic wave is emitted through the output window 4 in an optional direction. This requires the use of a waveguide for transmitting the beam to a desired place. When the beam of electromagnetic wave is transmitted in this manner through the waveguide, its energy gradually decreases. In other words, the transmission efficiency of the electromagnetic wave beam is reduced. In addition, if the beam of electromagnetic wave is transmitted through the waveguide, it is difficult to focus the beam onto a desired object. This is also the reason why the above-mentioned gyrotron device is unfavourable for heating the plasma in the nuclear fusion reactor.

Another type of a gyrotron device is known which uses a Fabry-Perot resonator. This device is called "quasi-optical gyrotron". The axis of its resonator is perpendicular to those of magnet coils which generates a magnetic field to guide an electron beam emitted by an electron gun. The device is thus non-axisymmetric, which requires a complicated positional adjustment of mirrors, the electron gun, magnet coils, and the like. The above-mentioned 10 MW-100 GHz gyrotron device also requires a large Fabry-Perot resonator to withstand a mirror heat load. Hence, large-sized magnet coils must be used in the high-power quasi-optical gyrotron, which inevitably raise the cost of manufacturing the quasi-optical gyrotron.

SUMMARY OF THE INVENTION

The object of the present invention is to provide a relatively small gyrotron device which can efficiently generate an intense beam of electromagnetic wave and efficiently transmit and easily focus the beam.

According to the invention, this can be achieved by a gyrotron device comprising a housing having a longitudinal axis; an electron gun means located at one end portion of the housing for emitting at least one electron beam along the longitudinal axis; a means for applying magnetic field to the electron beam short from the electron gun means; a resonator means arranged in the housing for quasi-optically reflecting and resonating electromagnetic waves generated when the electron beam passes along the magnetic lines of force of the magnetic field generated by the magnetic field applying means, the electromagnetic waves propagating in the radial directions of the housing; and a means located in the housing for optically reflecting and transmitting the electromagnetic waves resonated by the resonator means from the housing.

According to the present invention, the electromagnetic waves are quasi-optically reflected and resonated by the resonator means with the heat load reduced drastically. The gyrotron device of the invention can therefore resonate electromagnetic waves of large amplitudes, compared with the conventional gyrotron device provided with the cavity resonator.

Further, since the electromagnetic waves generated within the quasi-optical resonator means used in the gyrotron device of the present invention can be easily transmitted by the optical electromagnetic wave transmitting means, the energy loss of the electromagnetic waves can be minimized. Furthermore, when the electromagnetic waves are transmitted by the optical electromagnetic wave transmitting means, they can be easily focused onto an object. Still further, since the gyrotron device of this invention is axisymmetric, it can be easily fabricated though it includes wave-transmitting components.

BRIEF DESCRIPTION OF THE DRAWINGS

This and other objects as well as merits of the present invention will become apparent from the following detailed description in reference to the accompanying drawings.

FIG. 1 is a sectional view of a conventional gyrotron device;

FIG. 2 explains the principle of a gyrotron device of the present invention;

FIG. 3 is a perspective view of the mirror of partial transmission type which is used in the gyrotron device of FIG. 2 and is symmetrical to its axis;

DETAILED DESCRIPTION OF THE PREFERRED EMBODIMENTS

Figure 4:
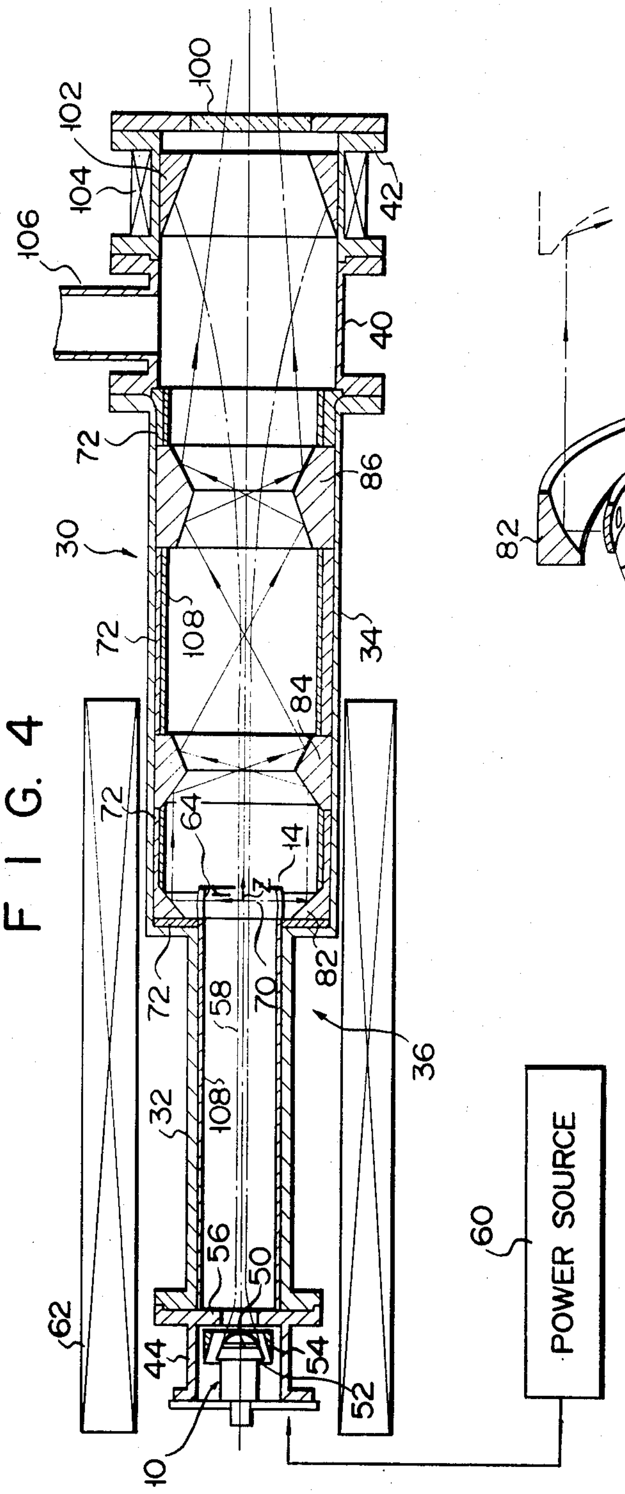
FIG. 4 is a sectional view of a first example of the gyrotron device according to the present invention.

FIGS. 2 and 3 schematically show an example of the gyrotron device according to the present invention. The gyrotron device comprises an electron gun of the magnetron type, i.e., a magnetron injection gun 10, a plurality of solenoid 12 arranged coaxially with the magnetron injection gun 10 to cause the gun 10 to emit an electron beam along the axis of the gun 10, and to keep electrons in the sectionally-ring-shaped electron beam gyrating, a mirror 14 of the partial transmission type arranged between the predetermined solenoids 12, coaxially with the gun 10 and symmetrically to its axis, and an electron beam dump 16 for collecting the electron beam. As shown in FIG. 3, the mirror 14 is a ring with inner circumferential surface which is a reflecting surface of the partial transmission type. With this gyrotron device, therefore, a gyrating electron beam 20 from the magnetron injection gun 10 runs along the magnetic lines of force of the magnetic fields generated by the solenoids 12, and electromagnetic waves are oscillated when the beam 20 passes through the mirror 14. Electromagnetic waves propagate in the radial direction of the mirror 14. They are then reflected and resonated by the reflecting surface 18 of the mirror 14 and thus amplified. A portion of the electromagnetic waves thus amplified passes through the mirror 14 in the radial direction thereof.

Figure 5:
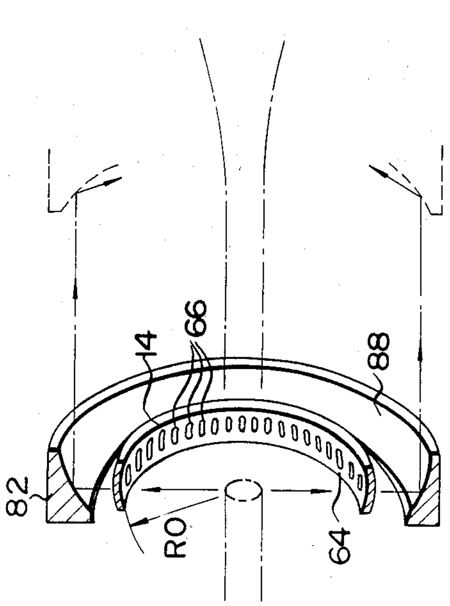
FIG. 5 is a fragmentary perspective view of the resonating reflection mirror of partial transmission type used in the device of FIG. 4, also showing a transmission mirror arranged coaxially with the resonating reflector mirror.

The above is intended only to previously and briefly describe the principle of the gyrotron device according to the present invention, and an actual example of the invention will be described below with reference to FIGS. 4 through 6.

Since the gyrotron device of this invention processes electromagnetic waves quasi-optically as described above, it is called quasi-optical gyrotron device. It has a stepped cylindrical housing 30 made of metal. The housing 30 comprises a main housing 36 consisting of a small-diameter portion 32 and a large-diameter portion 34, an intermediate cylindrical housing 40 air-tightly connected to the large-diameter portion 34 by a flange coupling, a cylindrical front end housing 42 air-tightly connected to the intermediate housing 40 by a flange coupling, and a gun housing 44 air-tightly connected to the small-diameter portion 32 by a flange coupling.

The magnetron injection gun 10 is located within the gun housing 44 and coaxial with the housing 30. As shown in FIG. 4, this gun 10 comprises a hot cathode 52 with a ring-shaped electron-emitting strip 50, a first ring-shaped anode 54 surrounding the hot cathode 52 and coaxial therewith, and a second ring-shaped anode 56 located near the first anode 54 to guide electrons from the hot cathode 52 to the first anode 54 along the axis of the main housing 36 or in the direction of arrow Z. This gun 10 can emit an electron beam 58, which is hollow cylindrical, into the main housing 36 in the direction Z. The electrodes 52, 54 and 56 are insulated from one another. A predetermined voltage is applied between the hot cathode 52 and first anode 54 and between the hot cathode 52 and second anode 56 from a power source 60. The gun 10 may be replaced by an electron gun which can emit a sheet-shaped electron beam. In short, any type of electron guns which can emit a gyrating electron beam may be used.

A superconducting coil 62 surrounds the electron gun housing 44 and main housing 36, coaxially extending from the housing 44 to the middle of the large-diameter portion 34 of the main housing 36. Therefore, the coil 62 generates a magnetic field which extends from the housing 44 to the middle of the large-diameter portion 34, thereby guiding the electron beam 58 in the direction Z along the magnetic lines of force, while gyrating the electron beam 58.

The ring-shaped resonator mirror 14, which is made of conductive material such as copper and is symmetrical to the axis of the main housing 36, is located within the large diameter portion 34 and adjacent to the small-diameter portion 32 thereof. The inner periphery of the resonator mirror 14 is a concave mirror, or a reflecting surface 64. The radius of curvature of the surface 64 at that section of the resonator mirror 14 which is taken along line r - Z, or the radius Ro of curvature of the reflecting surface 64 (FIG. 5), is the set Ro=D, where D is the diameter of this reflecting surface 64. Further, the resonator mirror 14 has a plurality of slots 66 at equal space arranged in the circumferential direction and extending in the axial direction. These slots 66 are cut in the thinnest portion or the center portion of the mirror 14 as viewed in the axial direction thereof.

Therefore, electromagnetic waves 70 are oscillated when the gyrating electron beam 58 passes along the magnetic field lines generated by the superconducting coil 62. Those oscillated electromagnetic waves 70 propagating in the resonator mirror 14 in the radial direction thereof are resonated and amplified as they are repeatedly reflected by the reflecting surface 64. The electromagnetic waves 70 thus resonated and amplified pass through the slots 66 in the radial direction of the resonator mirror 14.

The electromagnetic waves 70 passing through the slots 66 are transmitted through the housing 30 in the axial direction thereof by means of an electromagnetic-wave-transmitting mirror mechanism 80 with three transmitting mirrors 82, 84 and 86 which are symmetrical to the axis of the housing 30. These transmitting mirrors are rings made of copper, similar to the resonator mirror 14. The first transmitting mirror 82 is coaxial with the resonator mirror 14, surrounding the latter. Its inner periphery is a concave-mirror-like reflecting surface 88, facing away from the magnetron injection gun 10. The second transmitting mirror 84 is separated from the mirror 82 by a predetermined distance. Its inner periphery forms a first concave-mirror-like reflecting surface 90 facing the reflecting surface 88 of the first transmitting mirror 82, and a second concave-mirror-like reflecting surface 92 facing away from the first reflecting surface 90. The third transmitting mirror 86 is separated from the mirror 84 by a predetermined distance. Its inner periphery forms a first concave-mirror-like reflecting surface 94 facing the reflecting surface 92 of the second transmitting mirror 84, and a second concave-mirror-like reflecting surface 96 facing away from the first reflecting surface 94. Therefore, the transmitting mirrors 82, 84 and 86 are arranged in this order in the large-diameter portion 34 of the main housing 36 along the axis thereof and separated by four spacer rings 72, as shown in FIG. 4.

The shapes of the reflecting surfaces of the transmitting mirros 82, 84 and 86 will be explained with reference to FIG. 6. The reflecting surface 88 of the first transmitting mirror 82 is a surface of revolution, formed by rotating a portion of an ellipse F1, whose focuses are the center f1 of the reflecting surface 64 of the resonator mirror 14 and the center f2 of the first reflecting surface 90 of the second transmitting mirror 84, around the axis of the resonator mirror 14. The first reflecting surface 90 of the second transmitting mirror 84 is a surface of revolution, formed by rotating a portion of an ellipse F2, whose focuses are the center f3 of the reflecting surface 88 of the first transmitting mirror 82 and the center f4 of the second reflecting surface 92 of the second transmitting mirror 84, around the axis of the resonator mirror 14.

The second reflecting surface 92 of the second transmitting mirror 84 is a surface of revolution, formed by rotating a portion of an ellipse F3, whose focuses are the center f2, and the center f5 of the first reflecting surface 94 of the third transmitting mirror 86, around the axis of the resonator mirror 14. Further, the first reflecting surface 94 of the third transmitting mirror 86 is a surface of revolution, formed by rotating a portion of an ellipse F4, whose focuses are the center f4 and the center f6 of the second reflecting surface 96 of the third transmitting mirror 86, around the axis of the resonator mirror 14. Finally, the second reflecting surface 96 of the third transmitting mirror 86 is a surface of revolution, formed by rotating a portion of an ellipse F5, whose focuses are the center f5 and the heating point f7 of an object to be irradiated by the electromagnetic waves (or the heating point f7 of plasma when the gyrotron device of the present invention is employed to heat plasma in the nuclear fusion reactor), around the axis Z of the resonator mirror 14, as shown in FIG. 6.

Therefore, the electromagnetic waves emitted in the radial direction of the resonator mirror 14 can be transmitted along the axial direction of the housing 30 by reflecting them from each of the transmitting mirrors 82, 84 and 86. In addition, they can be easily focused onto the plasma P to effectively heat it.

The electromagnetic waves emitted from the gyrotron device as described above are practically output through an output window 100 which covers the opening of the front end housing portion 42 and is made of ceramics. Also arranged in the front end housing portion 42 is a ring-shaped electron beam dump 102 made of conductive material. The dump 102 collects the electron beam 58, which has passed through the resonator mirror 14. Attached to the outer periphery of the front end housing portion 42 is a superconducting coil 104 for drawing and collecting the electron beam 58 toward the electron beam dump 102. The members, e.g., the electron beam dump 102, which are heated by the electron beam, and the members, e.g., the mirrors, which are by electromagnetic waves, are cooled by a cooling means (not shown) with a cooling medium.

An evacuation conduit 106 is connected to the intermediate housing portion 40. This conduit 106 is also connected to a vacuum pump (not shown). It is sealed when the housing 30 is vacuumized to a predetermined value by this vacuum pump.

A graphite layer 108 is formed on the inner periphery of each spacer ring 72 and also on the inner periphery of the small-diameter portion 32 of the main housing 36. This layer 108 prevents electromagnetic waves of unnecessary mode from being oscillated and amplified at that area in the housing 30 at which the resonator mirror 14 is not included.

The superconducting coil 62 which surrounds the magnetron injection gun 10, resonator mirror 14, and transmitting mirrors 82, 84, 86 may be replayed by a plurality of coils. An ordinary conductive coil or a permanent magnet may be used instead of these coils if it can apply a predetermined magnetic field to the magnetron injection gun 10, resonator mirror 14 and transmitting mirrros 82, 84, 86.

The present invention is not limited to the above-described gyrotron device. A modification of this first gyrotron device will be described with reference to FIGS. 7 through 11.

Figure 7:
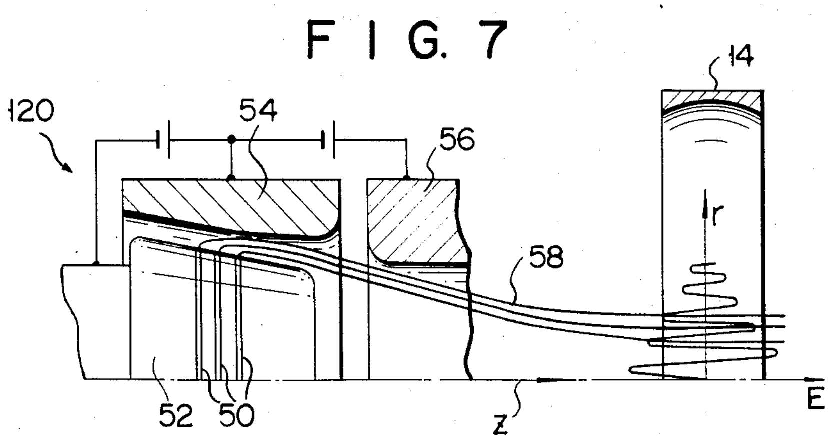
FIGS. 7 through 9 show various electron guns which may be used in the gyrotron device of FIG. 4.

FIG. 7 shows a magnetron injection gun 120. This gun 120 is different from the gun 10 (FIG. 4) only in that three electron emitting strips 50 are used in place of the hot cathode 52. It helps to inrease the output of the gyrotron device. The output of the gyrotron device may be increased only by enhancing the current of the electron beam 58. One of the easy methods to raise the current of the beam 58 is to increase the width of the strips 50 while keeping the current density of the beam 58 unchanged. (The "current density" is the number of electrons passing through the unit area of the electron beam 58.) In this case, the thickness of the hollow beam 58 (i.e., the difference between the outer and inner diameters of the beam 58) must be increased. When this thickness is greater than a quarter the wavelength of the electromagnetic waves oscillated in the resonator mirror 14, more of the electrons forming the beam 58 passing through the mirror 14 will pass through a region where the waves are less intense. Consequently, the output of the gyrotron device cannot be efficiently increased if the current of the beam 58 is raised.

In the hot cathode 52 of the magnetron injection gun 120, each electron emitting strip 50 is divided into three. Therefore, the three concentric electron beams 58 emitted from the gun 120 can pass through the peak point or can pass by it at the intensity distribution of the electric field E of the electromagnetic waves oscillated in the resonator mirror 14, as shown in FIG. 7, when the width of these electron emitting strips 50 and the intervals between them are set appropriately. Therefore, the electromagnetic waves can be effectively oscillated by the electron beams 58 emitted from the gun 120, thereby enhancing the output efficiency of the gyrotron device.

Figure 8:
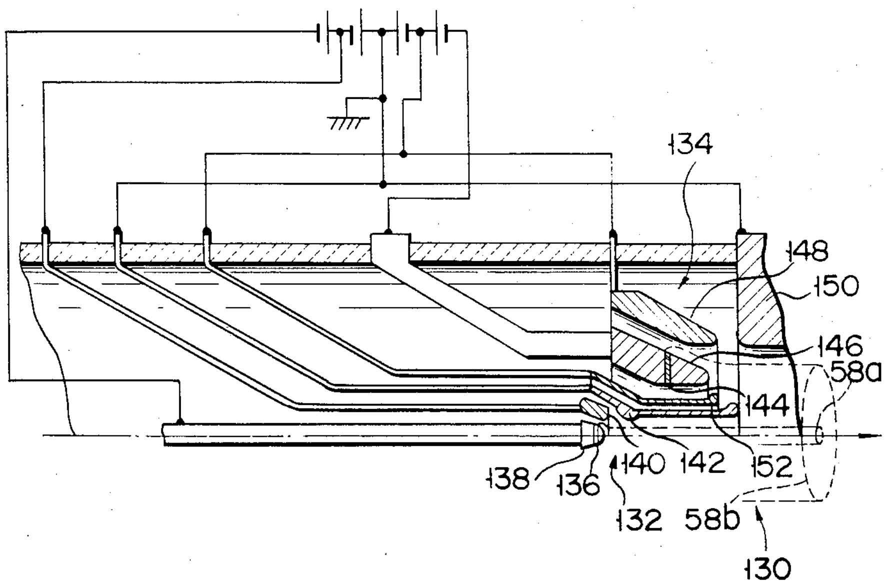

FIG. 8 shows another magnetron injection gun 130. This gun 130 comprises a first electron gun portion 132 of the magnetron type located on the axis of the housing 30 to emit a hollow electron beam 58*a*, and a second electron gun portion 134 of the magnetron type coaxially located aroung the first electron gun portion 132 to emit a hollow electron beam 58*b* similar to that of the magnetron injection gun 10. Since these gun portions 132 and 134 are fundamentally the same in construction as the magnetron injection gun 10, they will be described briefly. The first electron gun portion 132 comprises a hot cathode 138 provided with a ring-shaped electron emitting strip 136, and first and second anodes 140 and 142. Similarly, the second electron gun portion 134 comprises a hot cathode 146 provided with a ring-shaped electron emitting strip 144, and first and second anodes 148 and 150. Predetermined voltage is applied from the power source 60 to the electrodes of the electron gun portions 132 and 134. A control electrode 152 to which the same potential as that of the first anode 148 of the second electron gun portion 134 is applied is located between the first and second electron gun portions 132 and 134. The electrodes of the electron gun portions 132 and 134 are electrically insulated from one another by an electric insulator member 158 made of ceramics.

The merits of using the double-constructed magnetron injection gun 130 will be explained. The electromagnetic waves with various azimuthal mode numbers will be oscillated in the resonator mirror 14, i.e., one having an intensity distribution symmetrical in relation to the axis Z of the resonator mirror 14 and the other mode having an intensity distribution symmetrical in relation to the axis Z. The intensity distribution of the electromagnetic waves around the axis Z is usually shown by $e^{jm\theta}$, where $j=\sqrt{-1}$, $\theta$ is azimuthal coordinates in a cylindrical coordinates system (r, $\theta$, Z) around the axis of the resonator mirror 14, and m is a mode number of the electromagnetic waves in the direction $\theta$. It is well known that the amplitude of electromagnetic waves in the direction r (i.e., the radial direction of the resonator mirror 14) and under a mode number m is proportional to $Jm'(K \cdot r)$ near the axis Z. $Jm'=\partial Jm(x)/\partial x$, wherein Jm(x) is Bessel function of the first kind, and $K=2\pi/\lambda$, wherein $\lambda$ is the wavelength of electromagnetic waves.

It is known that the output efficiency of this kind of gyrotron device is proportional to the square of the amplitude of the electromgnetic waves at a point through which electrons of the electron beam 58 pass. If the radius r1 of the electron beam from the first electron gun portion 132 meets the condition of $Jo'^2 (K \cdot r1) >> Jm'^2 (K \cdot r1)$ ($m \neq 0$) in the resonator mirror 14, the electromagnetic waves under m=0 or under fundamental mode having an intensity distribution symmetrical to the axis could be effectively oscillated. Since, however, the radius r1 of the electron beam 58*a* which meets the above condition is very small, it is difficult to sufficiently increase the output power of the electron beam 58*a* emitted from the first electron gun portion 132. Therefore, when only the first electron gun 132 is used, the electromagnetic waves of the fundamental mode can be oscillated but not amplified efficiently.

Therefore, the hollow electron beam 58*b* having a radius r2 (r2>r1) is caused to enter from the second electron gun portion 134 into the resonator mirror 14 along the magnetic lines of force near the axis of the resonator mirror 14. Only the electromagnetic waves of the fundamental mode can be thus oscillated in the resonator mirror 14 due to the electron beam 58*a* entered. After the electromagnetic waves of fundamental mode are oscillated in this manner, the electron beam 58*b* is guided from the second electron gun portion 134 into the resonator mirror 14, thereby effectively amplifying the electromagnetic waves. Therefore, the electron beam 58*a* emitted from the first electron gun portion 132 of the gun 130 is combined with the beam 58*b* from the second electron gun portion 134, thus easily and effectively oscillating and amplifying the electromagnetic waves of the fundamental mode.

Figure 9:
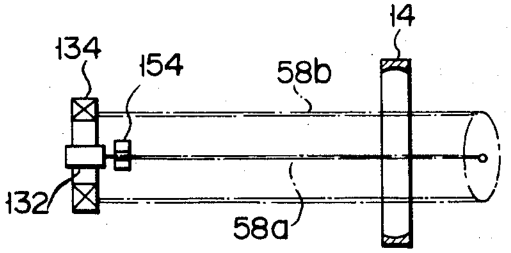

With reference to FIG. 9, the magnetron injection gun 130 includes a collimator 154 which is arranged at the output portion of the first electron gun portion 132.

Figure 10:
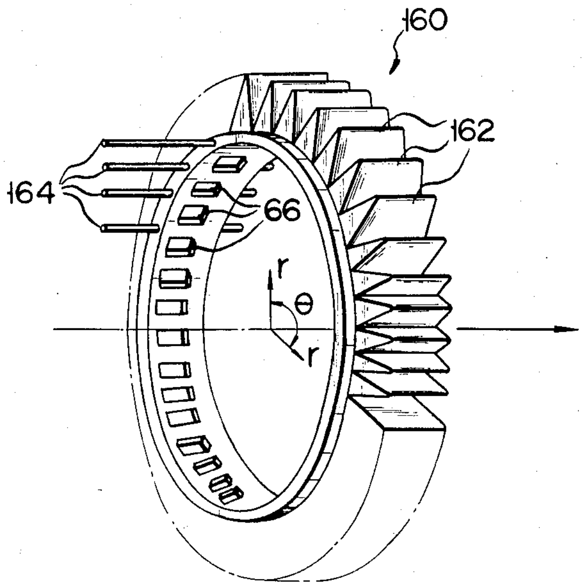
FIGS. 10 through 12 show various mirrors of a partial transmission type which may be used in the gyrotron device of FIG. 4.

FIG. 10 shows a resonator mirror 160. This mirror 160 includes a plurality of electromagnetic horns 162 attached to its outer periphery. The horns 162 cooperate with the slots 66 made in the outer periphery of the resonator mirror 14. The ripple of the electromagnetic waves emitted by the electromagnetic horns 162 in the radial direction of the mirror 160 can be shaped almost symmetrical to the axis of the mirror 160. The ripple can also be shaped almost axially symmetrical without using these electromagnetic horns 162, by reducing the interval between the slots 66. When the interval between the slots 66 is reduced, it becomes practically difficult to arrange a pipe or jacket, through which a coolant such as water flows to cool the resonator mirror, between the slots 66.

On the other hand, when the resonator mirror 160 is provided with the electromagnetic horns 162 as shown in FIG. 10, the interval between the slots 66 can be increased, so that the pipe 164 for conducting the coolant therethrough can be located between the slots 66 as shown in FIG. 10.

Figure 11:
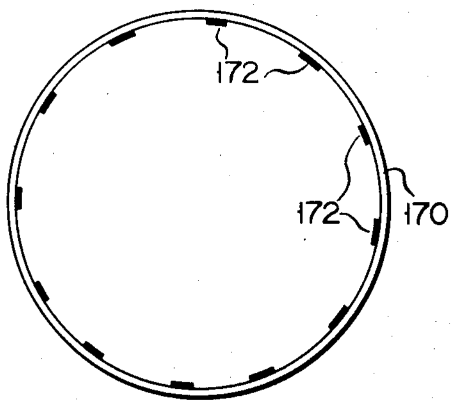

FIG. 11 shows another resonator mirror 170. The mirror 170 has electromagnetic wave absorbers 172 made of carbon material and arranged at regular intervals on the inner periphery of the mirror 170. The resonator mirror 170 can achieve an electromagnetic wave resonance of a predetermined mode due to these electromagnetic wave absorbers 172. More specifically, electromagnetic waves are oscillated when the electron beam 58 emitted from the magnetron injection gun 10, for example, passes through the resonator mirror 170, and it is known that the radial amplitude of the oscillated electromagnetic waves is proportional to $e^{jm\theta}$, where j, m and $\theta$ are defined as above. Preferably, electromagnetic waves having a specific number m of modes are oscillated without fail. When 2 m electromagnetic wave absorbers 172 are attached to the resonator mirror 170, this arrangement is equivalent to that where m optical resonators, each comprising a pair of opposed concave mirrors, are arranged around the axis. Accordingly, the electromagnetic waves smallest in diffraction loss and having the fundamental mode are supplied to each of the optical resonators. The amplitude distribution of the oscillated electromagnetic waves in the direction $\theta$ is denoted by cos ($m\theta$) in this case. Namely, electromagnetic waves having modes m, which corresponds to half the number of the electromagnetic wave absorbers 172, are selectively oscillated.

Figure 12:
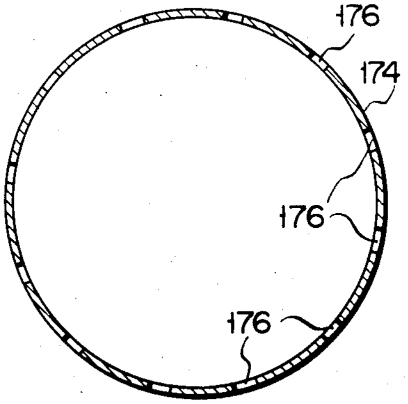

Further, openings 176 which correspond to the electromagnetic wave absorbers 172 may be made in the resonator mirror 174 at the regular intervals in the circumferential direction of the resonator mirror 174, as shown in FIG. 12, instead of using the electromagnetic wave absorbers 172. In FIG. 12, the slots 66 of the resonator mirror 174 are not illustrated.

Although all of the resonator mirrors described above are intended to reflect and oscillate the electromagnetic waves in the radial direction, not along the axis Z, the present invention is not limited only to this oscillating manner. A second embodiment of the present invention will be now described referring to FIGS. 13 through 16. This second example of the gyrotron device operates substantially in the same manner as the gyrotron device of FIG. 4. Therefore, the same members as those of the gyrotron device of FIG. 4 will be represented by the same numerals and will not be described in detail.

Figure 13:
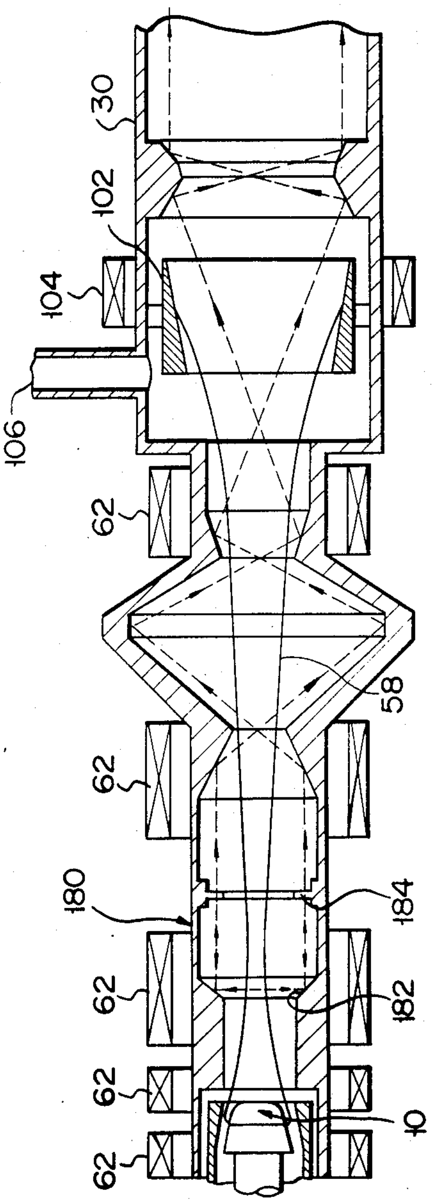
FIG. 13 is a sectional view of a second gyrotron device according to the present invention.
Figure 14:
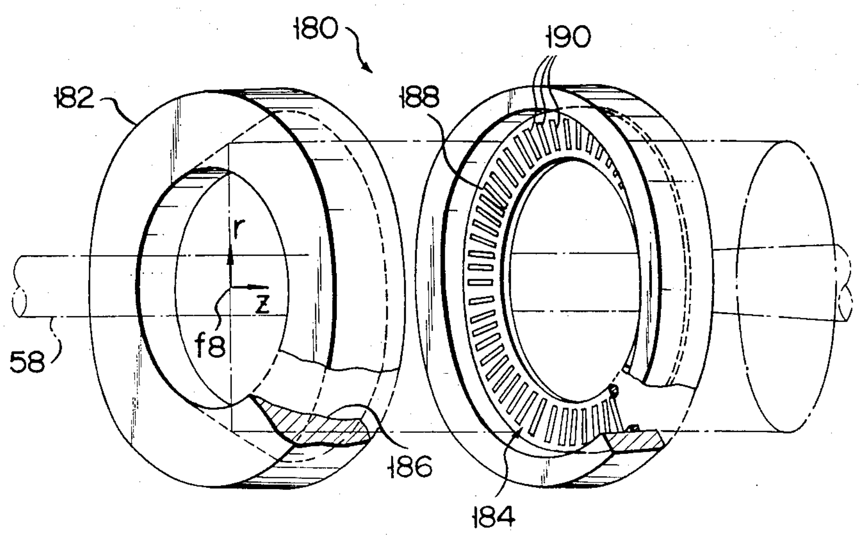
FIGS. 14 and 15 are perspective and sectional view of a resonating reflector mirror which is used in the device of FIG. 13 and is symmetrical to its axis, also showing the mirror of a partial transmission type which is employed in the gyrotron device of FIG. 13 and is symmetrical in relation to its axis.
Figure 15:
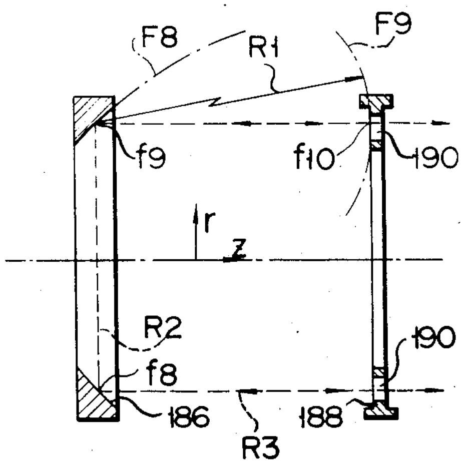
Figure 16:
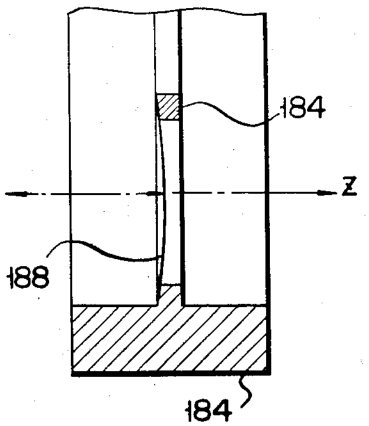
FIG. 16 is an enlarged sectional view of a part of the mirror of a partial transmission type shown in FIG. 15.

The resonator section 180 of the gyrotron device shown in FIG. 13 comprises a first axially symmetrical resonator mirror 182 for totally reflecting electromagnetic waves, parallel to the electron beam 58. The electromagnetic waves propagate in the radial direction of the electron beam 58 emitted from a magnetron injection gun 10. The resonator section 180 also comprises a second resonator mirror 184 of the partial transmission type separated in the axial direction from the first resonator mirror 182. This mirror 184 reflects a portion of the electromagnetic waves, which have been reflected by the first resonator mirror 182, toward the first resonator mirror 182, while allowing the remainder to pass therethrough in the axial direction. These resonator mirrors 182 and 184 are rings made of copper. As shown in FIGS. 14 and 15, the first resonator mirror 182 has a reflecting surface 186 defined by a portion of an ellipse of revolution F8 having focal points f8 and f10. On the other hand, the second resonator mirror 184 has a reflecting surface 188 which surfaces to the first resonator mirror 182. This reflecting surface 188, is a concave mirror formed by rotating a portion of an arc, whose center is the center f9 of the reflecting surface 186, around the axis of the second resonator mirror 184. A plurality of slots 190 are radially formed in the reflecting surface 188 of the second resonator mirror 184, as shown in FIG. 14. The slot 190 may be of any dimension if it is longer than the wavelength of the electromagnetic waves generated. Alternatively, a plurality of round openings having a diameter larger than the wavelength of the electromagnetic waves may be uniformly distributed in the reflecting surface 188. The slots 190 arranged in the reflecting surface 188 are not limited to the radial ones, but they may be arranged along the reflecting surface 188.

In the case of this second embodiment, the radius R1 of the arc F9 is equal to the diameter of the first resonator mirror 182. When the inner diameter R2 of the first resonator mirror 182 (which corresponds to the distance between the focuses f8 and f9) is made equal to the distance between the first and second resonator mirrors 182 and 184, the reflecting surface 188 of the second resonator mirror 184 can be made flat, and a plurality of electromagnetic horns can be aligned at the second resonator mirror to emit the output waves.

According to the above-described resonator section 180, the electromagnetic waves generated in the first resonator mirror 182 can be resonated and amplified as they are repeatedly reflected between the reflecting surfaces 186 and 190 of the first and second resonator mirrors 182 and 184, respectively. The electromagnetic waves thus resonated and amplified are transmitted in the axial direction of the second resonator mirror 184, passing through the second resonator mirror 184.

Figure 6:
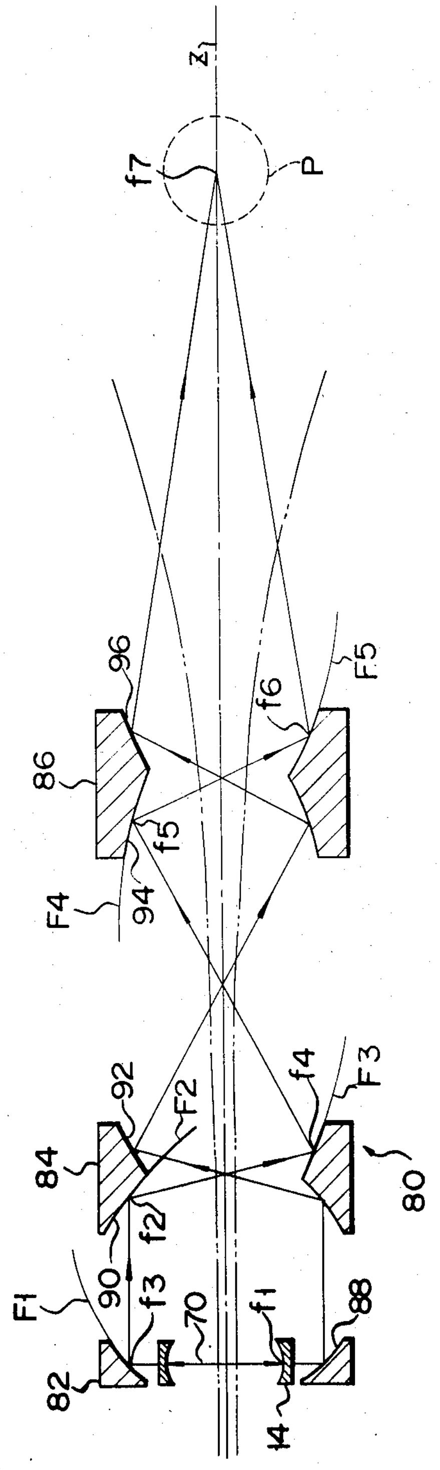
FIG. 6 illustrates how a beam of an electromagnetic wave is transmitted in the device of FIG. 4.

It has already become apparent that the electromagnetic waves passed through the second resonator mirror 184 are transmitted and focused onto an object by a transmission mechanism similar to the electromagnetic wave transmitting mechanism 80 of the gyrotron device shown in FIG. 6. Therefore, a description on the transmission mechanism will be omitted.

In the resonator section 180 in the second example of the gyrotron device, resonance and amplification of electromagnetic waves are carried out between the first and second resonator mirrors 182 and 184, thereby making it unnecessary to emit the electromagnetic waves outside the first resonator mirror 182 and in the radial direction thereof. In the gyrotron device shown in FIG. 13, no space for transmitting the electromagnetic waves is needed around the resonator mirror, whereby that portion of the housing 30 at which the first resonator mirror 182 is located can be made smaller. For the same reason, the superconducting coil 62 can be made smaller, so that the superconducting coil 62 is located around that portion of the housing 30 surrounding the first resonator mirror 182 to oscillate the electromagnetic waves.

In any of the above-described embodiments, quarter wavelength deep grooves having an appropriate pattern may be formed on the reflecting surface of the final transmitting mirror in the mirror mechanism 80 to convert the electromagnetic waves to linearly-polarized ones. Further, the electromagnetic waves reflected by the reflecting surface of the final transmitting mirror in the mirror mechanism 80 may be reflected by a reflecting plate, provided with a plurality of quarter wavelength deep grooves, to irradiate an object.

What is claimed is:

1. A gyrotron device comprising:

a housing having a longitudinal axis;

electron gun means located at one end portion of said housing to emit at least one electron beam along the longitudinal axis;

means for applying a magnetic field to the electron beam emitted from said electron gun means;

resonator means arranged in said housing said resonator means including at least one ring-shaped resonator mirror which quasi-optically reflects and resonates those electromagnetic waves caused when the electron beam passes along the magnetic lines of force generated by said magnetic field applying means, said resonator mirror being arranged coaxial with the axis of said housing, and having an annular reflecting surface which is a portion of surface of revolution of an arc around the axis of the resonator mirror, and a plurality of slots provided in the annular reflecting surface, to pass the electromagnetic waves; and transmitting means located in said housing and serving to optically reflect and transmit the electromagnetic waves resonated by said resonator means to emit them from said housing, said transmitting means including a plurality of annular reflecting mirrors which are disposed in said housing at predetermined intervals in the direction of the longitudinal axis and are coaxial with the longitudinal axis.

2. A gyrotron device according to claim 1, wherein said reflecting surface is formed on the inner peripheral surface of the resonator mirror, thereby providing a resonator cavity enclosed by said reflecting surface and extending in the radial direction, and said slots are arranged in the reflecting surface while being spaced in the circumferential direction, each of said slots being opened in the direction of travel of the resonating electromagnetic waves in the resonator cavity, and extending parallel to the longitudinal axis.

3. A gyrotron device according to claim 2, wherein electromagnetic horns are arranged around the resonator mirror to cooperate with the slots.

4. A gyrotron device according to claim 1, wherein the reflecting surface of the resonator mirror is provided with a means for dividing the reflecting surface into plural pairs of opposed reflecting surface parts, the paired reflecting surface parts being symmetrical in relation to the axis of the resonator mirror.

5. A gyrotron device according to claim 4, wherein the divider means includes electromagnetic wave absorbers, with the same interval left between them, attached to the reflecting surface of the resonator mirror and made of a carbon material.

6. A gyrotron device according to claim 4, wherein the divider means includes openings formed in the reflecting surface of the resonator mirror and separated from one another by the same interval in the circumferential direction of the resonator mirror.

7. A gyrotron device according to claim 1, wherein said resonator means includes a first resonator mirror arranged coaxial with the axis of said housing and having a first annular reflecting surface for reflecting the electromagnetic waves along the axis, and a second resonator mirror arranged coaxial with the axis, separated from the first resonator mirror in the axial direction, and having a second annular reflecting surface, said second annular reflecting surface facing said first reflecting surface and serving to reflect the electromagnetic waves, reflected by the first reflecting surface, toward the first reflecting surface, whereby a resonator cavity extending along the longitudinal axis is provided between the first and second reflecting surface while being spaced in the circumferential direction.

8. A gyrotron device according to claim 7, wherein the first resonator mirror is like a ring, its inner circumferential surface forms the first reflecting surface, and its first reflecting surface is a portion of an ellipse which has two focal points, and wherein the second resonator mirror is also like a ring, its one side surface which opposes the first resonator mirror forms the second reflecting surface, its second reflecting surface is a rotation surface formed by rotating around the axis a portion of an arc.

9. A gyrotron device according to claim 7, wherein each of said slots is opened in the direction of travel of the resonating electromagnetic waves in the resonator cavity, and extends in the radial direction.

10. A gyrotron device according to claim 1, wherein one of the transmission mirrors has a reflecting surface formed by rotating around the axis of said housing a portion of an ellipse which has one focus on the reflecting surface of a previous transmission mirror and the other focus on the reflecting surface of a next transmission mirror.

11. A gyrotron device according to claim 1, wherein said electron gun means includes a magnetron injection gun for emitting at least one electron beam which is ring-shaped.

12. A gyrotron device according to claim 11, wherein the magnetron injection gun includes a hot cathode provided with plural ring-shaped electron emitting strips, so that plural concentric electron beams can be emitted from the magnetron injection gun.

13. A gyrotron device according to claim 1, wherein said electron gun means includes a first electron gun portion for emitting a hollow electron beam along the axis of said housing, and a second electron gun portion for emitting a hollow electron beam which is coaxial with that of the first electron gun portion.

14. A gyrotron device according to claim 1, wherein a layer of graphite is formed, at least, on the inner wall of said housing in which the transmission means is located.

* * * * *